United States Patent [19]

Casad et al.

[11] 3,990,722
[45] Nov. 9, 1976

[54] SHOCK ABSORBING VEHICLE COUPLING

[75] Inventors: Edward F. Casad; Richard E. Jones, both of St. Marys, Ohio

[73] Assignee: Ajax Machine & Welding Company, St. Marys, Ohio

[22] Filed: June 5, 1975

[21] Appl. No.: 583,871

[52] U.S. Cl. .............................. 280/485; 267/138
[51] Int. Cl.² ......................................... B60D 1/00
[58] Field of Search ........... 280/485, 486, 487, 483, 280/484; 267/115, 138

[56] References Cited
UNITED STATES PATENTS

| | | | |
|---|---|---|---|
| 1,565,112 | 12/1925 | Sommer | 280/487 |
| 1,884,323 | 10/1932 | Snow | 280/487 |
| 2,121,416 | 6/1938 | White | 280/487 |

Primary Examiner—M. H. Wood, Jr.
Assistant Examiner—John A. Pekar

[57] ABSTRACT

A shock absorbing trailer hitch for cushioning end thrust shocks between towing and towed vehicles is disclosed having a base member rigidly attached to one vehicle with a pair of upstanding slide guides thereon and a second member slidably supported within the slide guides by a pair of generally parallel extending slide members. The second member provides one connector for coupling the vehicles together and tongue weight between the vehicles is borne by the slide members. Movement of the second member relative to the first is limited between rigid stop positions and cushioning of end thrust shocks is provided by a resilient plug which mechanically engages the first and second members and urges the second member toward a position intermediate the rigid stop positions.

8 Claims, 3 Drawing Figures

U.S. Patent
Nov. 9, 1976
3,990,722
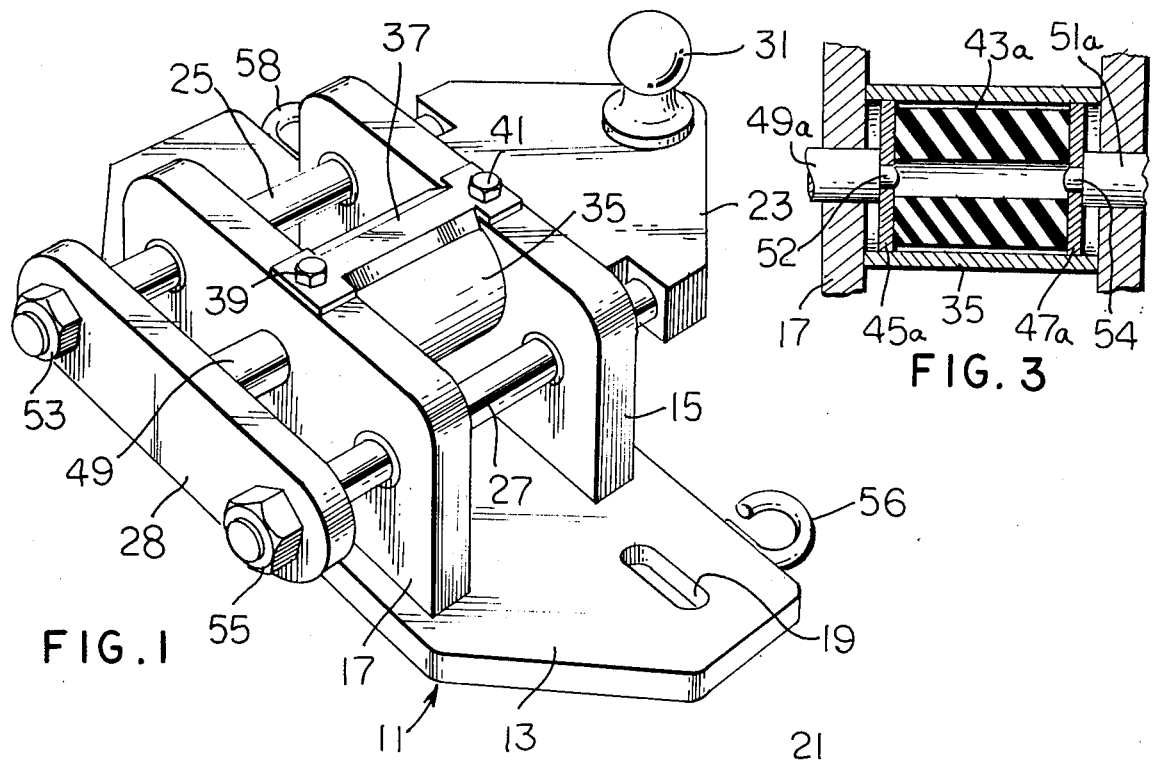
FIG. 1
FIG. 3
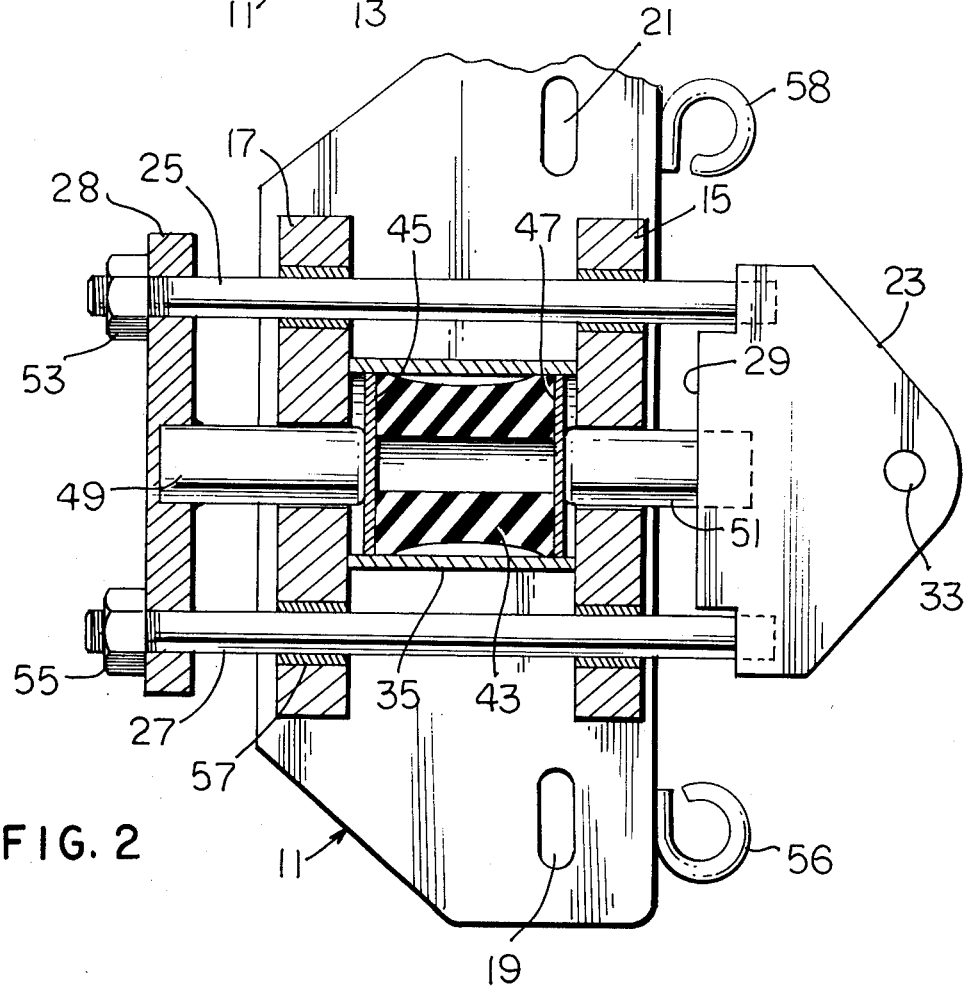
FIG. 2

SHOCK ABSORBING VEHICLE COUPLING

BACKGROUND OF THE INVENTION

The present invention relates generally to vehicle coupling mechanisms and more particularly to such mechanisms wherein a cushioning of end thrust shocks between the vehicle is provided.

The art of interconnecting vehicles in a tractive mode is well established and typically an otherwise rigid coupling including a ball and socket arrangement is employed to permit the two vehicles to swivel angularly relative to one another in negotiating turns to the left or right as well as abruptly encountered inclines. With such coupling schemes any jolt or shock experienced by one of the vehicles is immediately transmitted to the other by way of the coupling resulting in not only annoyance to the driver but also, due to the relatively large masses of the vehicles, great strain on the coupling mechanism.

It has been recognized that a resilient coupling between the vehicles will distribute the effect of an abrupt shock over a longer time interval materially reducing the stress on the coupling mechanism. Prior art schemes have provided spring loading, bump stops at the ends of the coupling travel, multiple resilient bushings and other more complex resilient structures which experience shear during the cushioning action, all of which suffer from one or more of the following defects. Tongue weight and other forces which do not act in the direction of traction are borne by the resilient member. Axial overloads, overloads in the tractive direction, may cause extrusion of a resilient member. Rotation about the axis of traction may occur. They are generally complex, expensive and lacking in ruggedness.

SUMMARY OF THE INVENTION

Among the several objects of the present invention may be noted the provision of a vehicle coupling which overcomes the disadvantages and undersirable features discussed hereinabove as well as others with respect to the prior art; the provision of a shock absorbing hitch which cushions axial shocks within limits yet provides a rigid coupling between the vehicles when those limits are exceeded; the provision of a shock absorbing hitch where non-axial loads are rigidly borne by the hitch; and the provision of a shock absorbing hitch which compresses a resilient member for axial loads regardless of the direction of the axial load.

In general, a shock absorbing hitch in one form of the invention is provided for reducing the transmission of axial or end thrust shocks between a towing and a towed vehicle having a base member rigidly attachable to one of the vehicles including slide guides, a second member including a pair of generally parallel slide members engaged with the slide guides for movement therealong between rigid stop positions, and a cushioning structure for retarding the free movement of the second member between the rigid stop positions.

Also in general in one form of the invention, a shock absorbing hitch has a first member rigidly attachable to one of the vehicles and a second member supported on and slidable relative to the first member between rigid stop positions with a resilient member mechanically engaging the first and second members for urging the second member toward a position intermediate the rigid stop positions with displacement from that intermediate position in either direction causing compression of the resilient member.

BRIEF DESCRIPTION OF THE DRAWING

FIG. 1 is a perspective view of the shock absorbing hitch according to the present invention;

FIG. 2 is a top view partially in section of the hitch of FIG. 1; and

FIG. 3 is a sectional view of a bushing and housing illustrating two possible variations according to the present invention.

Corresponding reference characters indicate corresponding parts throughout the drawing and the following examples illustrate the invention in one form thereof and are not to be construed as limiting in any manner.

DESCRIPTION OF THE PREFERRED EMBODIMENT

Referring now to the drawing in greater detail the shock absorbing hitch 11 is seen to include a first or base member 13 having a pair of slide guide members in the form of upstanding plates 15 and 17 each plate having a pair of apertures aligned with the corresponding apertures in the other plate. The base is attachable to, for example, a towing vehicle by passing bolts through the apertures 19 and 21 and through the frame, bed, step or bumper of the vehicle. A second member 23 is supported on and slidable relative to the base 13 by a pair of generally parallel slide members or rods 25 and 27 which pass through the pairs of apertures in the slide guides 15 and 17. The second member further includes a bump stop plate 28 which defines one rigid stop position for the second member and a bump stop portion 29 which defines a second rigid stop position for the second member 23. The second member 23 may further support one of a vehicle connector pair, for example, in the form of a hitch ball 31 or the connector pair may take the form of a simple aperture 33 to accept a clevis and pin type of coupling. The first member 13 further includes a housing in the form of a cylindrical shell 35 which is trapped or confined between the up-standing plates 15 and 17 and may further be held in position by a retainer plate 37 held in place by bolts 39 and 41 threaded into plates 15 and 17. The cylindrical shell 35 has confined or trapped therein a resilient plug 43 and a pair of compressive force transmitting end plates 45 and 47, as more clearly seen in FIG. 2.

The upstanding plates 15 and 17, in addition to providing sliding support to the second member 23 and parallel extending rods 25 and 27, also forms the end walls of the cylindrical shell 35. The shell 35 has in the opposite ends thereof the compressive force transmitting end plates 45 and 47. A pair of cantilever portions or rods 49 and 51 are secured to and extend from the respective bump stop plates 28 and 29 toward one another and into the housing 35 openings reciprocally through respective openings in the upstanding plates 17 and 15, respectively to engage the compressive force transmitting end plates 45 and 47. The resilient plug 43 provides its cushioning function by compression regardless of the direction of movement of the second member relative to the first. Under the minimum compression or strain the plug 43 positions the second member intermediate its two rigid stop positions and of course retards the free movement of the second member between these two rigid stop positions. If the second member is displaced from its intermediate or minimum compression position toward either rigid stop position, compression of the resilient plug 43 results.

Assembly and installation of the hitch of the present invention as well as its mode of operation should now be clear. The second member 23 with the slide members or rods 25 and 27 as well as the cantilever portion 51 attached thereto is passed through first companion bearing openings in the upstanding plate 15 and then upstanding plate 17 with the cylinder 35 and the cushioning means therein already in place after which the bump stop plate 28 and its appended cantilever portion 49 is attached to the parallel slide members 25 and 27 by, for example, threaded fasteners 53 and 55. The assembled two members 13 and 23 of the hitch may then be attached to a vehicle by welding or passing bolts through the apertures 19 and 21. When coupled to a second vehicle for example by way of the hitch ball 31, forces in the axial direction cause the second member 23 to slide relative to the first further compressing the resilient plug 43 whereas forces such as tongue weight in the non-axial or non-tractive direction are borne by the parallel slide members 25 and 27. Lubricated bushings such as 57 may be provided to reduce hitch wear if desired.

Any relative movement between the two vehicles in the axial direction causes one of the two cantilever portions or plungers 49 and 51 to pass further through their respective plates 17 and 15 into the housing interior causing compression of the resilient plug 43. For example, if the hitch is fixed to a tractive or towing vehicle acceleration of that vehicle would cause plunger 49 to move toward the right as viewed in FIG. 2 forcing by way of plate 45 the resilient member 43 to be compressed against plate 47 which in turn transmits the force to the base 13 and therefore the vehicle by engagement with the plate 15.

The resilient member 43 may be in the form of a hollow polyurethane bushing and may, if desired, have its cylindrical outer side wall somewhat concave annularly as depicted in FIG. 2 to provide an expansion space when the resilient member is compressed or this outer side wall may be substantially straight as in FIG. 3.

The retainer plate 37 and corresponding bolts 39 and 41 with their corresponding threaded holes in the plates 15 and 17 may be eliminated by the utilization of one of the variations depicted in FIG. 3. In FIG. 3, the rods or plungers 49a and 51a have corresponding studs 52 and 54 extending therefrom and passing through corresponding holes in the end plates 45a and 47a. These studs in conjunction with their corresponding end plates function to prevent housing 35 from shifting laterally.

A second variation illustrated in FIG. 3 is in the configuration of the bushing 43a. A bushing with a straight outer side wall as depicted in FIG. 3 gives a less resilient load response as does diminution of the bushing inner bore diameter. It should also be noted that the load-compression curves for the polyurethane bushings have hysteresis loop characteristics, that is, when the load is being relaxed the same compression results from a lesser load than when the bushing is being compressed. In other words the same load force corresponds to a lesser compression when the bushing is being compressed and a greater compression when the bushing is returning to its uncompressed state. A correlative trait of the polyurethane bushing is the damping provided thereby. With the prior art spring type shock absorbing hitches, oscillations can occur since such structures are usually underdamped. The polyurethane provides an aperiodic or overdamped arrangement and no oscillations occur.

To further exemplify the present invention, one preferred embodiment designed for a maximum recommended tongue or hitch weight of 2500 pounds and a maximum pull or tractive force before reaching a rigid stop position of from 4000 to 10,000 pounds depending on the bushing design has been constructed of the following materials and parameters: The cylindrical hollow resilient plug 43 was made of a molded polyurethane material having a maximum outside diameter of 1.78 inches, a minimum outside diameter of 1.60 inches, a one inch inside diameter, and an axial length of 2⅝ inches. About ¾ inch compression was experienced by this plug when subjected to typical heavy tractive forces. The member 23 was a ¾ inch thick cold rolled steel plate with ¾ inch diameter nine inches long cold rolled steel slide members 25 and 27 welded thereto on three inch centers. The bump stop plate 28, and base supported slide guides 15 and 17 were similarly ¾ inch thick cold rolled steel and apertured so as to support the slide member center lines about one inch above the top surface of a ⅜ inch hot rolled steel base plate. The cantilevers 49 and 51 were formed of one inch diameter cold rolled steel and weldingly supported to extend toward each other from their respective bump stop surfaces about 1 13/16 inches each. Plug 43 was bounded by a pair of 1¾ inch diameter 3/16 to ¼ inch thick case hardened discs 45 and 47 as determined by the particular plug design within a three inch long, two inch outside diameter cold drawn tube 35. This provided about 1⅞ to 2 inches of travel between the rigid stop positions. Mounting apertures 19 and 21 were elongated so as to allow ready attachment to a variety of vehicle mounting holes varying between eight and ten inches separation. Four load bearings 57, for example, of the steel-bronze-lead type eliminated any necessity for lubrication.

From the foregoing it is now apparent that a novel vehicle connector 11 has been presented meeting the objects, advantages and features set out hereinbefore as well as others. Numerous modifications will readily suggest themselves to those of ordinary skill in the art. For example, the specific type of connector may as mentioned previously be a ball and socket type connector or a clevis and pin arrangement as well as other types of connector pairs ordinarily encountered. The base 13 may be provided with safety chain attaching loops such as 56 and 58 if desired. Further, the particular one of the pair mounted on the hitch or the particular vehicle to which the shock absorbing hitch is attached is a matter of choice. These and other variations will readily suggest themselves to those of ordinary skill in the art and accordingly the scope of the present invention is to be measured only by that of he appended claims.

What is claimed is

1. A shock absorbing hitch to reduce the transmission of end thrust shocks between a towing and a towed vehicle comprising:
 a first base member rigidly attachable to one of the vehicles including slide guide means;
 a second member slidingly supported by the first member including a pair of generally parallel extending slide members engaged with the slide guide means and slidable therein between rigid stop positions;

cushioning means for retarding the free movement of the second member between the rigid stop positions; and the slide guide means comprises a pair of upstanding plates each having a pair of aligned slide member accepting apertures therein, the second member including a pair of opposed bump stop plates affixed to opposite ends of the pair of slide members, a bump stop plate engaging an upstanding plate to define a rigid stop position.

2. The hitch of claim 1 further comprising a hitch ball affixed to one of the bump stop plates.

3. The hitch of claim 1 wherein the first member includes a housing having openings at opposite ends thereof;

the cushioning means includes a pair of compressive force transmitting end plates disposed inside the housing each adjacent a housing opening, and a resilient plug disposed between the end plates and confined within the housing; and the second member includes a pair of cantilever portions each extending into a housing opening to compress by way of a corresponding end plate the resilient plug when moved toward the housing.

4. The hitch of claim 3 wherein each cantilever portion is supported on an individual one of the bump stop plates and extends therefrom toward the other cantilever portion.

5. A shock absorbing hitch to reduce the transmission of end thrust shocks between a towing and a towed vehicle comprising:

a first member attachable to one of the vehicles; a second member attachable to the other of said vehicles; a resilient member having a first end and a second end, opposite to said first end;

first and second force-transmitting members being attached in spaced relation to said first member;

first and second force-transmitting members being attached in spaced relation to said second member;

said resilient member being interposed said first and second force-transmitting members of said first member and being interposed said first and second force-transmitting members of said second member;

means for providing engagement of said first force-transmitting member of said first member with said first end of said resilient member and for providing engagement of said second force-transmitting member of said second member with said second end of said resilient member during movement of one of said vehicles relative the other of said vehicles in a first direction; and means for providing engagement of said second force-transmitting member of said first member with said second end of said resilient member and for providing engagement between said first transmitting member of said second member with said first end of said resilient member during movement of said one of said vehicles relative said other of said vehicles in a direction opposite said first direction.

6. The hitch of claim 5 wherein said resilient member comprises a polyurethane bushing.

7. A shock absorbing hitch to reduce the transmission of end thrust shocks between a towing and a towed vehicle comprising:

a first base member rigidly attachable to one of the vehicles including slide guide means;

a second member slidingly supported by the first member including a pair of generally parallel extending slide members engaged with the slide guide means and slidable therein between rigid stop positions;

cushioning means for retarding the free movement of the second member between the rigid stop positions;

the first member includes a housing having openings at opposite ends thereof;

the cushioning means includes a pair of compressive force-transmitting end plates disposed inside the housing each adjacent a housing opening, and a resilient plug disposed between the end plates and trapped within the housing; and the second member includes a pair of cantilever portions each extending into a housing opening to compress by way of a corresponding end plate the resilient plug when moved toward the housing.

8. A shock absorbing hitch to cushioningly mount on one vehicle one of a connector pair for selectively interconnecting a towed and a towing vehicle comprising:

a first member rigidly attachable to the one vehicle;

a second member supported on and slidable relative to the first member between rigid stop positions, one of the connector pair being affixed to the second member near one end thereof; and resilient means mechanically engaging the first and second members for urging the second member toward a position intermediate the rigid stop positions relative to the first member with relative displacement from the intermediate position toward either rigid stop position causing compression of the resilient means;

said first member includes a housing having openings at opposite ends thereof;

the resilient means includes a pair of compressive force-transmitting end plates disposed inside the housing each adjacent a housing opening, and a resilient plug disposed between the end plates and confined within the housing; and the second member includes a pair of cantilever portions each extending into a housing opening to compress by way of a corresponding end plate the resilient plug when moved toward the housing.

* * * * *